May 23, 1950     W. E. DORN     2,509,138
HEATING DEVICE
Filed Aug. 28, 1948     2 Sheets-Sheet 1
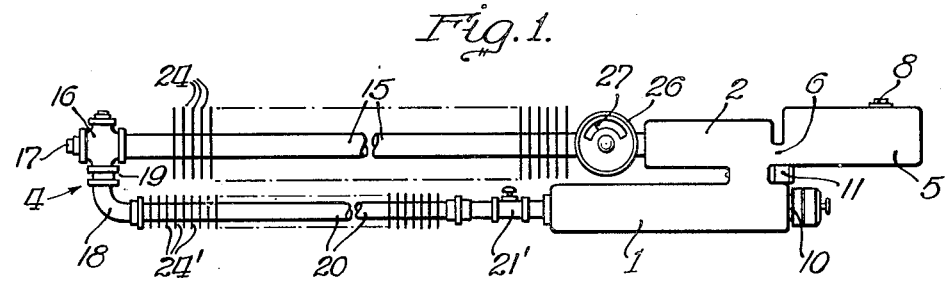
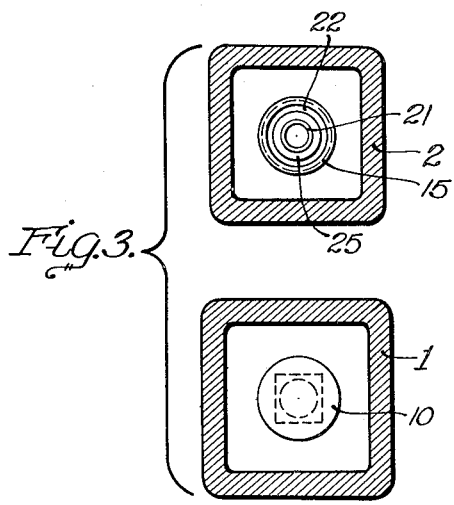
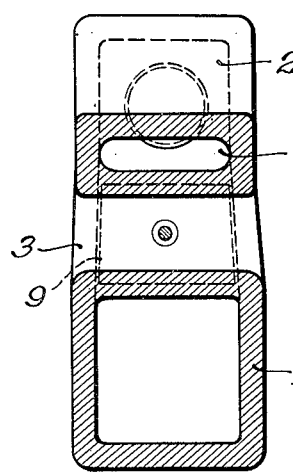
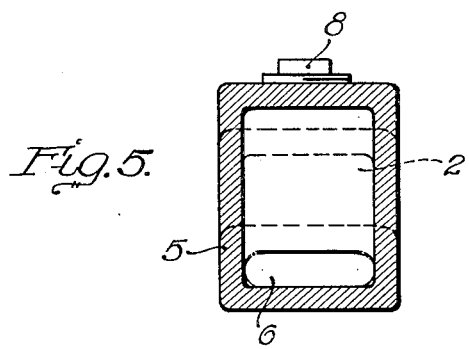
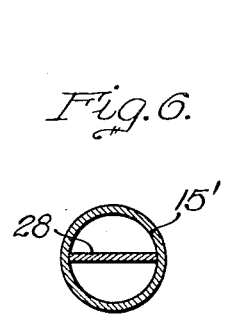
INVENTOR.
William E. Dorn

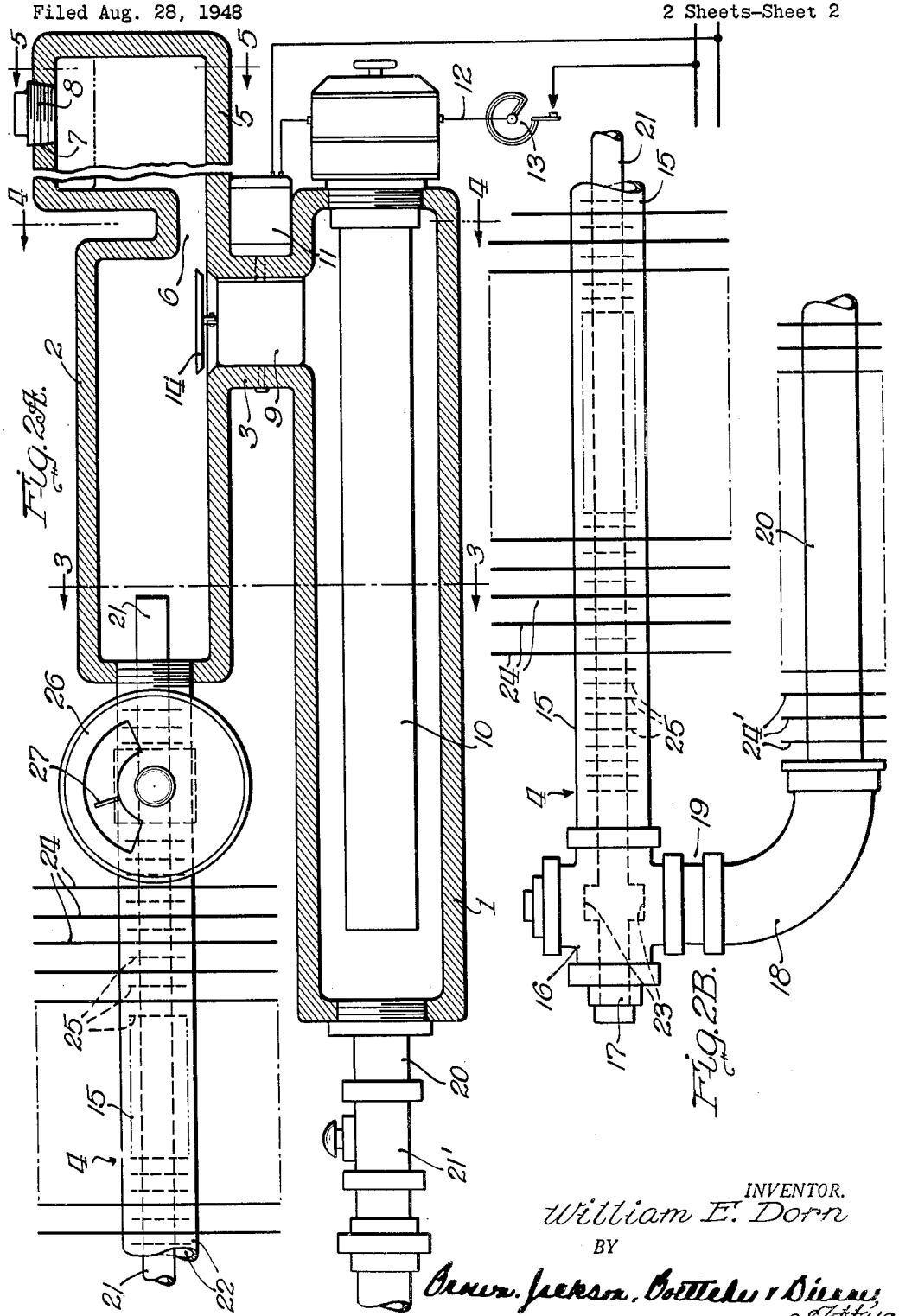

Patented May 23, 1950

2,509,138

UNITED STATES PATENT OFFICE 2,509,138

HEATING DEVICE

William E. Dorn, Prairie View, Ill., assignor of one-half to William F. Jonas, Antioch, Ill.

Application August 28, 1948, Serial No. 46,665

7 Claims. (Cl. 219—39)

This invention relates, in general, to heating devices, and has particular relation to an improved electric fluid heater unit.

One of the main objects of the invention is to provide an improved form of heater which can be used as a complete base board panel radiator heating system or otherwise as desired for heating rooms or other spaces; also, a heater that can be combined with other similar heaters to provide a complete heating system for homes or other buildings or elsewhere where there are a number of spaces to be heated.

Another object of the invention is to provide a heater of the class described in which the water or other liquid can be brought up to the desired temperature within a short period of time, and which will operate effectively to distribute the heat throughout the room or other space.

Another object of the invention is to provide an improved electric heater which will require only a relatively small amount of electric current.

Another object of the invention is to provide a novel and improved unitary construction and arrangement wherein there is a heating chamber in which the heating element is disposed combined with a liquid holding chamber, and in which there is a connecting passage between the heating chamber and the liquid holding chamber with a pump located in such passage; also, a return passage leading from the holding chamber back to the heating chamber and in which a suitable radiator is provided.

Another object of the invention is to provide in a heater of the class described means for equalizing any back pressure that may be caused by the expansion of the circulating liquid due to its heated condition.

Further objects and advantages of the invention will appear from the following detailed description taken in connection with the accompanying drawings in which:

Figure 1 is an elevational view of a heater embodying the present invention;

Figure 2A is a fragmentary vertical section through the heating, liquid holding and compression chambers of the heater;

Figure 2B shows the remaining part of the heater which is broken away or omitted in Figure 2A;

Figure 3 is a vertical detail section taken on the line 3—3 of Figure 2A;

Figure 4 is a vertical detail section taken on the line 4—4 of Figure 2A;

Figure 5 is a vertical detail section taken on the line 5—5 of Figure 2A; and

Figure 6 is a detail transverse section through an alternative form of return pipe.

Referring now to the drawings, the embodiment of the invention selected for illustration comprises a heating chamber 1 combined with a liquid holding chamber 2 and in which there is a connecting passage 3 between these chambers.

A return passage, designated in its entirety at 4, leads from the holding chamber 2 back to the heating chamber 1. A suitable radiator and, if desired, a thermostat control are provided in the return passage 4, as will be presently described.

A compression chamber 5 has relatively restricted communication at 6 with the bottom of the liquid holding chamber 2. The compression chamber 5 extends upwardly to a height above the top of the space within the holding chamber 2, so that any back pressure which may be caused by the expansion of the circulating liquid can be equalized in the compression chamber, there being an air space above the liquid in the compression chamber.

The compression chamber 5 is provided in the top wall thereof with a filler opening 7 through which the desired liquid is introduced into the heater and which is closed by a removable plug 8.

Disposed within the passage 3 is a liquid circulating pump 9 which may be of any suitable or preferred form. In the heating chamber 1 is provided an elongated immersion heating element 10 which may be of any commercial type. The pump 9 is provided with an electric motor shown more or less diagrammatically at 11 for driving the same. The pump motor 11 and heating element 10 are connected into an electric circuit 12 supplied with current, for example, from a suitable source of current, such as a household or building current supply line. The circuit 12 may be provided with a room or space thermostat which is shown at 13. The thermostat 13 is located in the room or otherwise where it will be subjected to the heat supplied by the heater.

A valve member 14 which can be hand operated from outside the heater by means not shown, or which can be operated by the motor 11 is adapted to be moved to a substantially closed position when the motor stops, whereby substantially to shut off communication between chambers 2 and 1 until the heating element 10 and motor 11 are again set in operation. In again setting the heating element and motor in operation the valve member 14 is moved to open position manually or automatically as above set forth.

The return passage 4 comprises a pipe 15 screwed at one end into the adjacent wall of the liquid holding chamber 2 and opening into this chamber. The opposite end of the pipe 15 is screwed into a fitting 16 which has at its opposite end a removable cap or plug 17 in axial alignment with the pipe 15. An elbow 18 connected or coupled at 19 to the fitting 16 leads to a pipe 20 which, at its opposite end, is connected to the adjacent end of the wall of the heating chamber 1 and opens into the interior of this chamber. Within its length the pipe 20 is provided with a globe or hand valve or other suitable valve 21' which may be adjusted to regulate the return of liquid to the heating chamber 1.

Internally of and coaxial with the pipe 15 is an inner return pipe 21, one end of which extends into the chamber 2 and opens into this chamber. There is an annular space 22 between the exterior of the pipe 21 and the interior of the pipe 15. The opposite end of pipe 21 may be supported, for example, by the cap or plug 17. Within the fitting 16 the wall of pipe 21 has openings 23 opening into the fitting.

The return passage 4 is, as previously stated, provided with a radiator for delivering the heat from the heated liquid in the heater to the room or other space. This radiator may be of any suitable or preferred form. In the illustrated embodiment of the invention the radiator comprises a plurality of spaced and parallel heat radiating fins 24 fixed on and extending from the pipe 15. The inner return pipe 21 is also preferably provided with a plurality of spaced and parallel heat radiating fins 25 fixed on and extending therefrom into the space 22 between the pipes 15 and 21. The outer ends of the fins 25 are spaced from the interior of the pipe 15 to permit flow or circulation of the heated liquid through the space 22. The fins 25 extend from the chamber 2 to the fitting 16 but, of course, this may vary. The pipe 20 may also be provided with fins 24'.

The passage 4 may also be provided with a thermostat or thermal control device 26 having a pointer 27 and with the bi-metal or thermally responsive element of the device subject to the heat of the liquid in passage 4. The thermostat 26 may be connected to control the motor 11 and heating element 10 in accordance with the temperature of the liquid in the passage 4, or it may be combined with the room or space thermostat 13 in a manner to provide a joint control for the motor 11 and heating element 10.

When the circuit for the heating element 10 and motor 11 is closed, the heating element is set in operation and heats the liquid in the heating chamber 1. The valve 14 is opened and the pump 9 is set in operation simultaneously with the heating element. If desired, a time delay may be provided for delaying starting of the motor 9 and opening of valve 14 where such a valve is present until the heating element 10 has brought the liquid in the chamber 1 up to substantially the desired temperature. The liquid in the heating chamber 1 is brought up to the desired temperature within a short period of time.

As the pump 9 starts to operate it pumps the heated liquid from the chamber 1 up through passage 3 and into chamber 2. The heated liquid flows in the direction of the arrows out from the chamber 2 through pipes 15 and 21 to the fitting 16 from where the liquid flows out through the elbow 18 and pipe 20 back to the heating chamber 1. The internal fins 25 in conjunction with the external fins 24 operate to get the maximum B. t. u. out of the heated liquid before it is returned to the heating chamber, and the fins 24 operate effectively to distribute the heat throughout the room or other space.

When the motor and heating element are stopped, for example, by the thermal control at the desired temperature, the liquid ceases to circulate back through the heating chamber 1. The pump 9 may be of a character so that when stopped it will prevent or substantially prevent circulation through the passage 3, or the valve 14 may be closed or substantially closed at this time where such a valve is employed. The fins 24 and 25 will, however, continue to take heat from the liquid in the passage 4, and the fins 24 will continue effectively to distribute the heat throughout the room or other space.

As the liquid in the passage 4 cools it will tend to rise to the top of the passage. At this time the end of the return pipe 21 adjacent the chamber 2 is the hot end and the end at the fitting 16 is the colder end. As a result, there appears to be some tendency for the heated liquid to circulate from the chamber 2 outwardly through the space 22 between the pipes 15 and 21 and to return through the inner pipe 21 to the chamber 2 when the motor and heating element are not in operation. This further assures extraction of the maximum B. t. u. from the liquid and effective distribution of the same throughout the room or other space.

In the event of any back pressure caused by the expansion of the circulating liquid due to its heated condition, it will act through the relatively restricted opening 6 and into the compression chamber 5. The air above the level of the liquid in the compression chamber will act to cushion and equalize such back pressure.

As a modification or alternative embodiment of the invention, I contemplate omitting the inner return pipe 21 and its fins 25 and providing in lieu thereof, as shown in Figure 6, a horizontal partition 28 extending horizontally and diametrically across the interior of the pipe 15' and dividing the same horizontally from end to end.

As a further embodiment of the invention, I contemplate omitting the type of return passage 4 previously described, closing the outer end of the pipe 20 and providing the interior of this pipe 20 with a horizontal partition similar to the partition 28 in Figure 6. In such embodiment, the heater liquid will flow out from the heating chamber through the upper part of the pipe corresponding with the pipe 20 and will return to the heating chamber through the lower part of the pipe below the partition therein. In this further embodiment of the invention, the compression chamber corresponding with the compression chamber 5 in Figure 1 will communicate directly with the heating chamber.

The embodiments of the invention shown in the drawings are for illustrative purposes only and it is to be expressly understood that such drawings and the accompanying specification are not to be construed as a definition of the limits or scope of the invention, reference being had to the appended claims for that purpose.

I claim:

1. In a heater of the class described, in combination, a unitary casting embodying a heating chamber, a liquid holding chamber, and a passage leading from said heating chamber to said liquid holding chamber, a heater in said heating chamber, a return passage leading from the holding chamber back to said heating chamber, a radiator in said return passage for extracting heat from liquid in said heater and for distributing same to a space, and a pump in the passage leading from said heating chamber to said liquid holding chamber and operable to pump liquid from said heating chamber to said holding chamber and to cause the liquid to flow from said holding chamber through said return passage and back to said heating chamber.

2. A heater according to claim 1 wherein the heating and holding chambers are superposed and there is a compression chamber formed as a part of the unitary casting and positioned above the heating chamber and longitudinally outwardly from one end of the holding chamber, said compression chamber having relatively restricted communication at the bottom with the bottom of said liquid holding chamber, said compression chamber extending upwardly to a height above the top of the space within said liquid holding chamber.

3. A heater according to claim 1 wherein the heating and holding chambers are of elongated form with the holding chamber superposed above the heating chamber and there is a compression chamber formed as a part of the unitary casing and positioned longitudinally outwardly from one end of the holding chamber, said compression chamber having relatively restricted communication at the bottom with the bottom of said liquid holding chamber, said compression chamber extending upwardly to a height above the top of the space within said liquid holding chamber, and a filler opening at the top of said compression chamber for filling the heater with liquid.

4. A heater according to claim 1 wherein said return passage comprises an outer pipe and coaxial inner pipe having an annular space between the exterior thereof and the interior of said outer pipe.

5. A heater according to claim 1 wherein said return passage comprises an outer pipe and coaxial inner pipe having an annular space between the exterior thereof and the interior of said outer pipe, and wherein said outer pipe has outwardly extending heat radiating fins and said inner pipe has heat extracting fins extending outwardly into the space between said pipes and spaced at their outer ends from the interior of said outer pipe.

6. A heater according to claim 1 wherein said return passage comprises a pipe, and a generally horizontal partition dividing the interior of said inner pipe.

7. A heater according to claim 1 wherein there is a compression chamber having relative restricted communication at the bottom with the bottom of said liquid holding chamber, said compression chamber extending upwardly to a height above the top of the space within said liquid holding chamber, and wherein said return passage comprises an outer pipe and a coaxial inner pipe having an annular space between the exterior thereof and the interior of said outer pipe, said outer pipe having outwardly extending heat radiating fins and said inner pipe having heat extracting fins extending outwardly into the space between said pipes and spaced at their outer ends from the interior of said outer pipe.

WILLIAM E. DORN.

REFERENCES CITED

The following references are of record in the file of this patent:

UNITED STATES PATENTS

| Number | Name | Date |
|---|---|---|
| 1,907,357 | Kovesdy | May 2, 1933 |
| 2,166,509 | Smith | July 18, 1939 |
| 2,344,812 | Gill | Mar. 21, 1944 |